United States Patent [19]

Sauer

[11] Patent Number: 5,905,524

[45] Date of Patent: May 18, 1999

[54] DIGITAL ISDN VIDEO SERVER

[75] Inventor: Peter Sauer, Ditzingen, Germany

[73] Assignee: Alcatel Alsthom Compagnie Generale d'Electricite, Paris, France

[21] Appl. No.: 08/905,469

[22] Filed: Aug. 4, 1997

[30] Foreign Application Priority Data

Aug. 6, 1996 [DE] Germany .................. 196 31 939

[51] Int. Cl.$^6$ .................................................. H04N 7/14
[52] U.S. Cl. .............................. 348/15; 348/13; 348/16
[58] Field of Search .............. 348/13, 17; 379/93.25, 379/93.15, 102.01, 102.02, 102.03

[56] References Cited

U.S. PATENT DOCUMENTS

| 5,278,889 | 1/1994 | Papanicolaou et al. . | |
| 5,371,532 | 12/1994 | Gelman et al. | 348/7 |
| 5,539,448 | 7/1996 | Verhille et al. | 348/16 |
| 5,748,493 | 5/1998 | Lightfoot et al. | 348/7 |
| 5,812,778 | 9/1998 | Peters et al. | 395/200.49 |
| 5,815,146 | 9/1998 | Youden et al. | 345/327 |
| 5,828,370 | 10/1998 | Moeller et al. | 348/328 |

FOREIGN PATENT DOCUMENTS

| 0624040 | 11/1994 | European Pat. Off. . |
| 0676898 | 10/1995 | European Pat. Off. . |
| 2699034 | 6/1994 | France . |
| 3233958 | 11/1983 | Germany . |
| 4441685 | 6/1996 | Germany . |

OTHER PUBLICATIONS

"Telsis Video–Call–the world;s first commercially available ISDN server for interactive videotelephony" from Interactive Video Telephony by Prospects of The Telsis Co., Copyrt 1995.

*Primary Examiner*—Paul Loomis
*Assistant Examiner*—Melur Ramakrishnaiah
*Attorney, Agent, or Firm*—Ware, Fressola, Van Der Sluys & Adolphson LLP

[57] ABSTRACT

Creation of a digital ISDN server for distribution and interactive services in video telephony, which can be used for a great number of video telephones including video telephones of different designs. Provision of video and audio signals with different formats and different transmission rates for different video telephones. Signalling of a terminal (TN1, . . . , TNp) is provided by the server for each requesting video telephone, where coded video and audio signals of different transmission rates and different formats are provided according to the design of the video telephone. These are available either in real time or are downloaded from corresponding storage media. In addition, an interactive control can be implemented.

11 Claims, 3 Drawing Sheets

■ INTRA-codiert   □ INTER-codiert

DIGITAL ISDN VIDEO SERVER

TECHNICAL FIELD

The invention concerns a digital ISDN video server which provides a data stream of coded video and audio signals.

BACKGROUND OF THE INVENTION

A distribution service for video telephones is known from the ITU-T recommendation H.331. More precisely, it defines the functionality of the distribution service (broadcast service). Such a distribution service establishes the coding process whereby the video and audio signals are encoded. The signalling parameters are established as well.

A so-called video phone server is also known in the state of the art. This ISDN server offers a number of services to a caller. A caller calls the ISDN server via a conventional ISDN-H.320 video phone and is able to select information. Up to 1000 different services are offered in this case. This video phone server provides 9×2 B-channels.

The function of storing the incoming information is also known. In this case a TV program to be currently transmitted is stored and can be transmitted with time-delay. Accordingly a caller can either request previously stored messages or call up messages that were transmitted in real time.

A larger version of this video telephone server may contain 15×2 channels. A disadvantage of such a server is that only 30 video phones can access the server at the same time, and that only video telephones which operate in accordance with the H.320 standard are able to access this server (from: Interactive Video Telephony by Prospects of the Telsis Company, Copyright 1995 Telsis, received via CeBit '96).

SUMMARY OF THE INVENTION

It is the task of the present invention to create a video server which is in a position to serve video telephones of different designs. A further task of the invention is to provide a number of subscribers with access to the ISDN server. The invention achieves this via a digital ISDN video server for providing data streams of coded video and audio signals for video telephones of different designs, comprising a plurality of video coders and a plurality of audio coders for coding uncoded video signals and uncoded audio signals, respectively, in real time to make available the coded video and audio signals in different formats; a switching unit for performing signaling functions and for establishing a respective connection between the video telephones of different designs and the digital ISDN video server; respective signaling means for each video telephone for determining the coded video and audio signals which are processible by the respective video telephones, for multiplexing or demultiplexing the coded video and audio signals for a respective one of the video telephones, and for performing error correction for a respective one of the video telephones; a switching network for switching the coded video and audio signals to the signaling means; and a controller for controlling the provision of the data stream by the digital ISDN video server for the video telephones of different designs via the signaling means.

It is an advantage in this case that a cost-effective video server is created for video telephones of different designs and constructions. Accordingly the video server can deliver data streams to any video telephone and is therefore universally applicable.

The digital ISDN server can include an audio/video memory for storing coded video and audio signals of different formats, thus allowing a time-delayed request of a video message. It can incorporate the function of a video call answering machine as well as that of a video recorder in one server.

The digital ISDN server can include a controller designed as an interactive controller, wherein the coded video and audio signals are stored in several data streams, and wherein each of the data streams contains differently positioned intraframes for restarting the coding to perform the functions of fast forward and rewind within the coded data stream. This configuration leads to the fact that fast-forward and rewinding within the coded data stream are possible. In this way a passage can be viewed repeatedly, but a passage can also be skipped over by means of fast-forward.

The digital ISDN server can also provide that a number of subscribers can have access to one data stream by the use of intraframes.

The digital ISDN server can provide for data stream selection and control by tone dialing or by signaling in the B channel. An advantage in the handling results in this manner that a tone is dialed from the video telephone in order to control the ISDN server. This can also take place by signalling in the B-channel.

BRIEF DESCRIPTION OF THE DRAWINGS

The invention is explained in the following by means of configuration examples wherein.

BEST MODE FOR CARRYING OUT THE INVENTION

Figure 1:
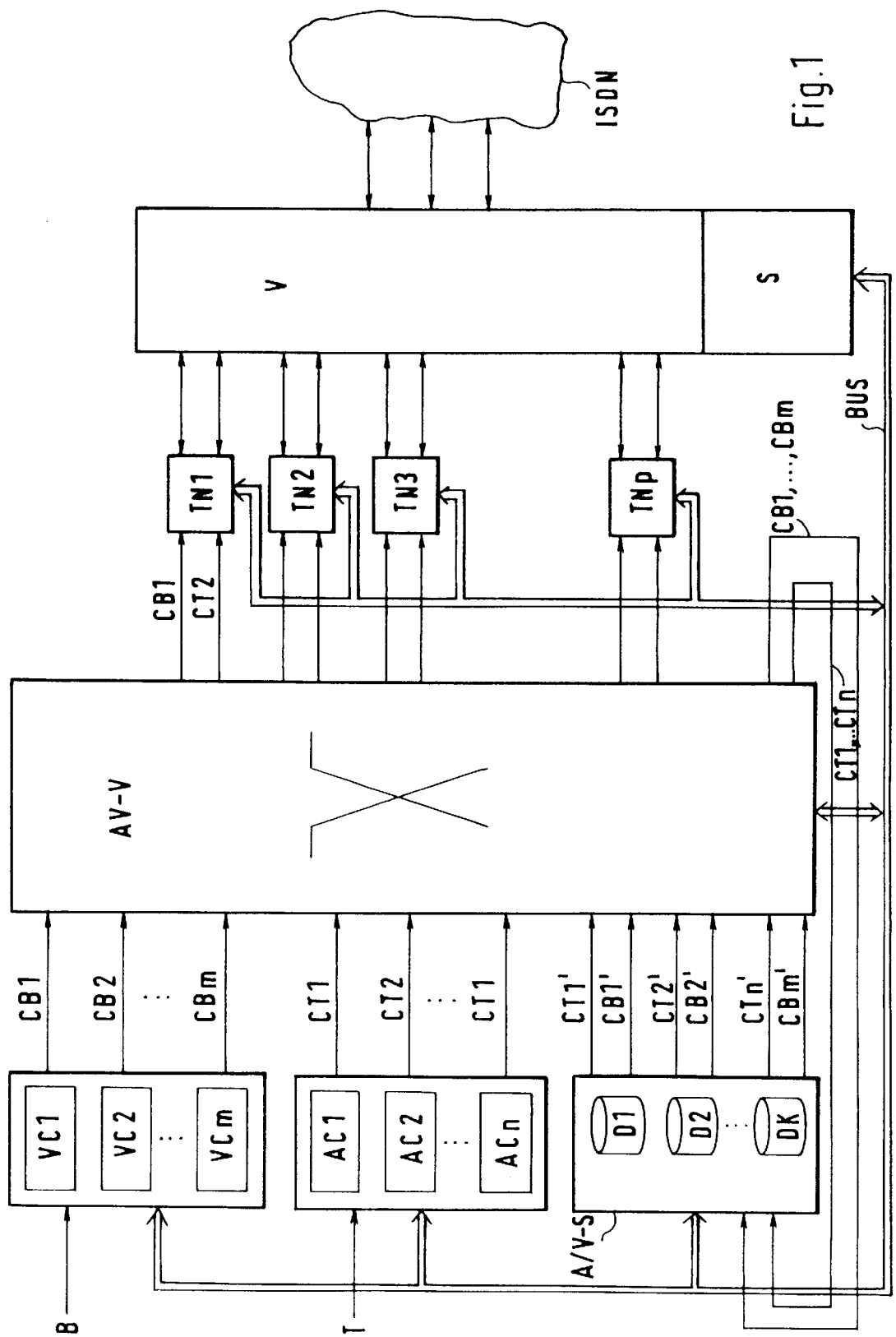
FIG. 1 is a digital ISDN video server for providing data streams.

In the following the invention is explained in greater detail by means of FIG. 1. A digital ISDN video server for providing data streams of coded video and audio signals CB1, CB2, . . . , CBm, CT1, CT2, . . . , CTn for video telephones of different designs contains a number of video coders VC1, VC, . . . , VCm and a number of audio coders AC1, AC2, . . . , ACn. The video coders and the audio coders are used to code video signals B or audio signals T respectively in real time. The number of video coders and the number of audio coders are used to provide coded video and audio signals CB1, CB2, . . . , CBm, CT1, CT2, . . . , CTn.

The digital ISDN video server also contains a switching unit V for performing network signalling and to establish a connection between the video telephones of different designs and the digital ISDN video server. Calls from a video telephone are received by the digital ISDN video server via the switching unit V and are then switched to the means TN1, . . . , TNp for signalling a respective one of the video telephones. The switching unit V can be one which operates in accordance with the I.400 series for example. The means TN1, . . . , TNp for signalling a respective one of the video telephones determine the coded video and audio signals CB1, CB2, . . . , CBm, CT1, CT2, . . . , CTn which can be processed by the respective video telephones. The signalling means TN1, . . . , TNp are also used for multiplexing or demultiplexing the coded video and audio signals for a respective one of the video telephones, or to perform an error correction for a respective one of the video telephones. The signalling of the terminal can take place in accordance with the H.242 ITU standard for example. The multiplexer and demultiplexer can be designed in accordance with the H.221 ITU standard for example, and the error correction can be designed in accordance with the H.261 ITU standard. Every signalling means TN1, . . . , TNp is connected to the switching unit V.

The digital ISDN video server furthermore contains a switching network AV-V for switching the coded video and audio signals to the signalling means. This switching network, which is used for audio/video distribution, is designed to receive the coded video signals CB1, CB2, . . . , CBm as well as the coded audio signals CT1, CT2, . . . , CTn. As already explained previously, the coded video and audio signals are provided in different formats, which means that the video and audio signals are coded differently and can be transmitted at a different transmission rate. The switching network AV-V switches coded video and audio signals, which are determined according to signalling, to the signalling means TN1, . . . , TNp. In this case a first coded video signal CB1 and a second coded audio signal CT2 are switched to the first signalling means TN1 for example. The first coded video signal CB1 and the first coded audio signal CT1 for example are also switched to the second signalling means TN2. This makes possible any constellation that corresponds to the processable video and audio signals.

The digital ISDN video server furthermore contains a controller S to control the provision of the data stream. The controller S for example is connected via a bus system BUS with each signalling means TN1, . . . , TNp, as well as with the switching network AV-V and also with the number of video coders VC1, VC2, . . . , VCm and the number of audio coders AC1, AC2, . . . , ACn. In addition the controller S is directly connected to the switching unit V. After a request from a video telephone is received by the digital ISDN video server and is transmitted to the signalling means TN1, . . . , TNp, the controller S is used to control the transmission of the coded video and audio signals to the respective signalling means. The video coders VC1, VC2, . . . , VCm can operate for example in accordance with the H.261 ITU standard. The audio coders AC1, AC2, . . . , ACn operate for example according to the G.711 or the G.722 standard. The different formats for video telephones explained in the preceding description allow the selection of a signal quality which is suitable for a subscriber. This ensures that each subscriber has an optimum signal quality available in his terminal.

Also illustrated in FIG. 1 is an audio/video memory A/V-S which provides stored, coded video and audio signals CB1', CB2', . . . , CBm', CT1', CT2', . . . , CTn'. These stored, coded video and audio signals are also provided in different formats, meaning in different codes. To that end the audio/video memory A/V-S contains a number of memories D1, D2, . . . , Dk. These memories can be designed in the form of disk memories for example. Thus in addition to the audio and video signals coded in real time, audio and video sequences in different formats are also available from the memory. One of its configurations is that the video and audio signals coded in real time are additionally stored in the audio/video memory A/V-S. To that end the coded video and audio signals available in real time in the switching network AV-V are supplied to the audio/video memory for storage therein. This makes it possible for signals arriving in real time to be recorded and called up later. One possible application for such stored video and audio signals can be found in the storage of messages for example. Currently available messages, e.g. coming from television, are supplied to the digital ISDN video server where they are stored and can be called up at any time by a video telephone via an ISDN network. In updated messages which arrive in the form of video and audio signals these data can be overwritten, and the subscriber of a video telephone has the possibility of requesting updated messages at any time. In addition to the pure video telephony in which direct communication with another subscriber takes place, there is also an application where a video and audio message is recorded and called up later. This is the function of a so-called video telephone answering machine.

Figure 2:
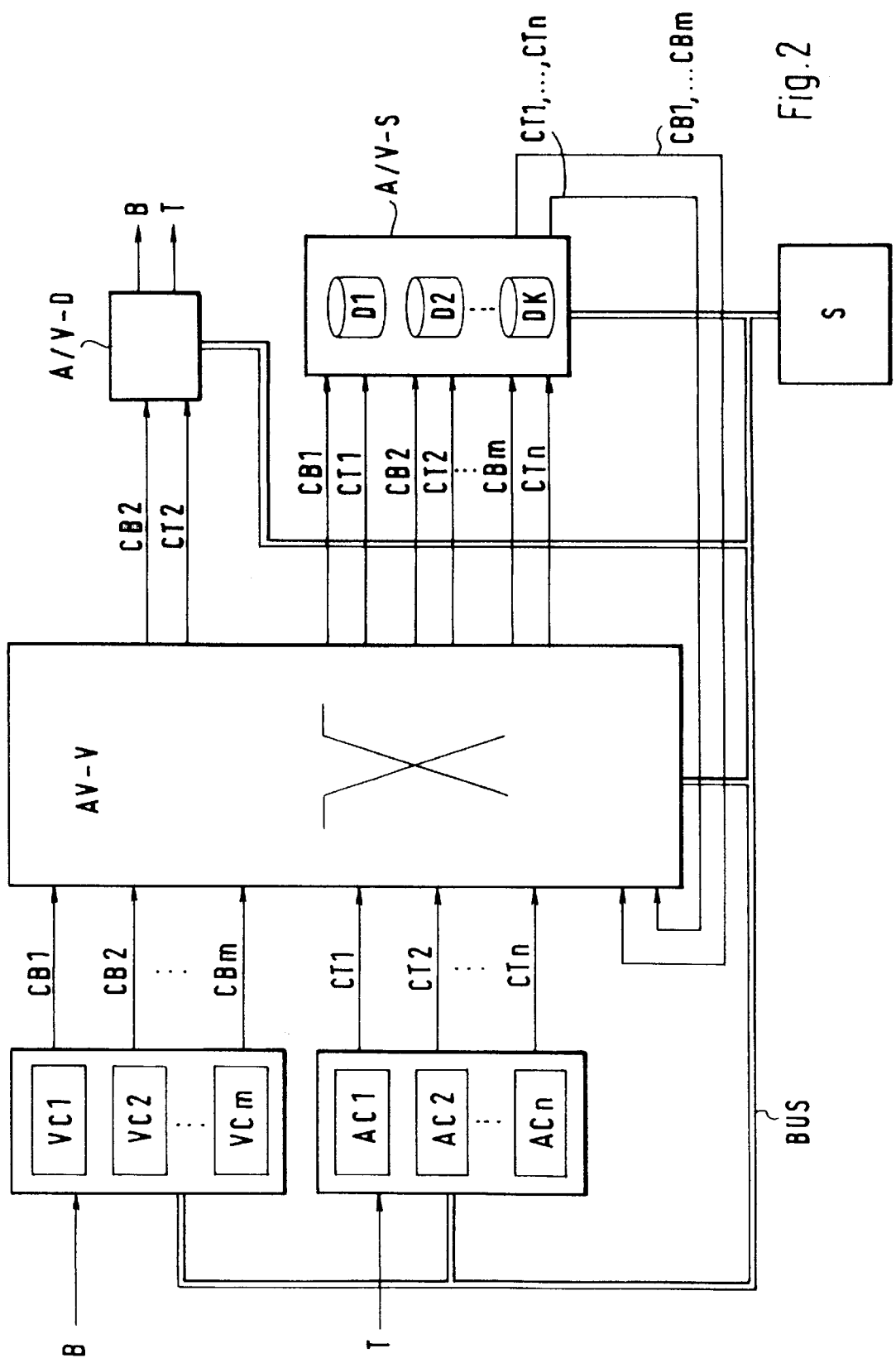
FIG. 2 is a digital ISDN video server with storage capability for the signals provided in real time.

The following explains by means of FIG. 2 how real time video and audio signals are stored. A video signal B and an audio signal T are located respectively in the number of video recorders VC1, VC2, . . . , VCm and in the number of audio recorders AC1, AC2, . . . , ACn. All the video recorders and audio recorders are drawn ganged in each case since an incoming video signal and an incoming audio signal can be coded by each one of the video recorders or by each one of the audio recorders. The video signal B is coded by one of the video recorders, which is the reason for a coded video signal CB1, CB2, . . . , CBm at the output of the video recorders. An incoming audio signal T is coded by one of the audio recorders, which is the reason for a coded audio signal CT1, CT2, . . . , CTn at the output. As already explained earlier, these are supplied to the switching network AV-V. If there is now a request for the coded video and audio signals to be stored, the coded video signals CB1, CB2, . . . , CBm and the coded audio signals CT1, CT2, . . . , CTn are supplied to the audio/video memory A/V-S. This is where the incoming coded video and audio signals are stored in memories D1, D2, . . . , Dk. These memories can be disk memories for example. Video and audio signals stored in this manner are now available to the switching network AV-V as coded, stored video and audio signals CT1', CT2', . . . , CTn', CB1', CB2', . . . , CBm'. In this way a user of the digital ISDN video server has available video and audio signals coded in real time and stored, coded video and audio signals.

To control what is currently being stored, the coded video and audio signals are supplied to an audio/video-decoder A/V-D. In this case it is designed for example so that the coded video signal CB2 and the coded audio signal CT2 are supplied to the audio/video decoder. They are then again decoded into a video and audio signal B, T and are considered for the purpose of control. All the elements of FIG. 2 are interconnected by means of a controller. For example the controller S is connected to all the elements via a bus BUS and controls the storage of the coded video and audio signals.

Figure 3:
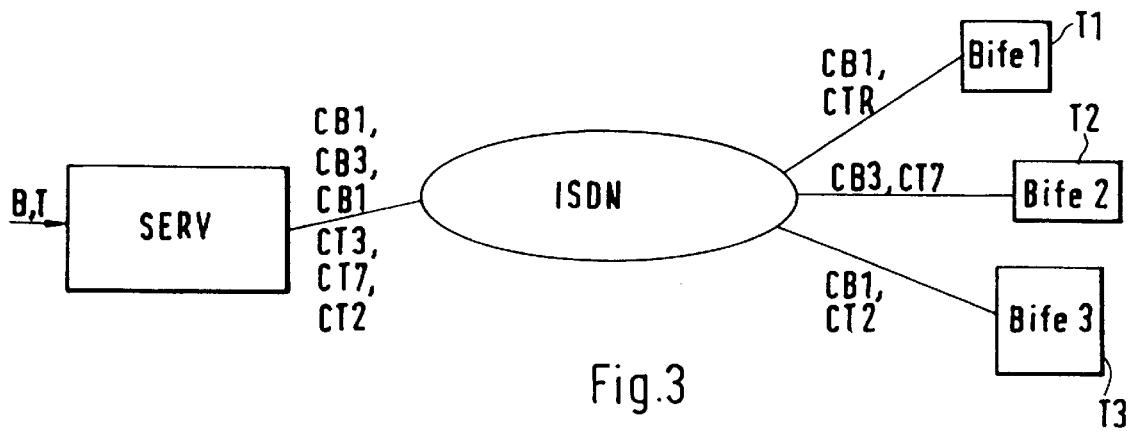
FIG. 3 is a schematic illustration of a system using an ISDN video server.

By means of FIG. 3 the following explains a method of using the digital ISDN video server. Using an ISDN network ISDN, a first subscriber T1 at a video telephone Bife 1 dials a digital ISDN video server SERV. Using the previously explained means, the digital ISDN server SERV determines which signals can be processed by the video telephone Bife 1 and a suitable signal quality is provided accordingly. As already explained earlier, an incoming video and audio signal B, T can be processed in real time, or it can be stored and transmitted later to a video telephone. A second subscriber T2 is also connected to the digital ISDN server SERV via a video telephone Bife 2. A third subscriber T3 is connected to the digital ISDN server SERV via the ISDN network ISDN and via a third video telephone Bife 3. To perform the function of the so-called distribution service, the existing video and audio signals B, T are distributed to the three video telephones Bife 1, Bife 2, Bife 3. In this case it is possible for these three video telephones to have different designs. Different designs means that these video telephones process different codes and different transmission rates. As previously explained for FIG. 1, it is a premise in this instance that individual signalling takes place for each video telephone. In this case it is recognized which coding and which data transmission are needed by a video telephone in order to have a high signal quality. As illustrated in FIG. 3, the digital ISDN server SERV provides the following coded video signals for example: CB1, CB3, CB1. The coded audio signals CT3, CT7, CT2 are also provided for example. These are transmitted via the ISDN network, in which case the video telephone Bife 1 processes the coded video signals CB1 and the coded audio signal CT3. The video telephone Bife 2 processes the coded video signal CB3 and the coded audio signal CT7. The video telephone Bife 3 processes the signals CB1, CT2. The previously explained selection is only given as an example.

Figure 4:
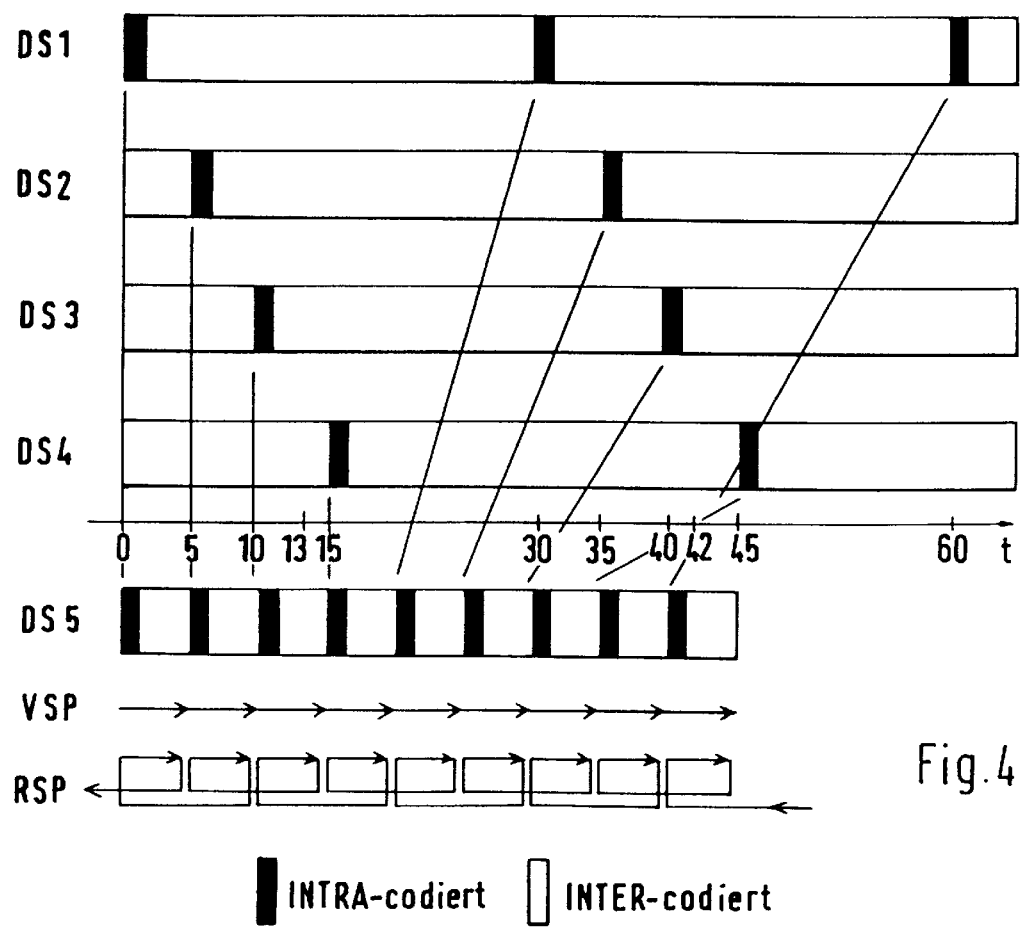
FIG. 4 illustrates coded data streams for interactive access.

In addition to the distribution service it is possible to implement a so-called interactive control of the digital ISDN server. By means of FIG. 4 the following explains an interactive control for a digital ISDN server in greater detail. FIG. 4 illustrates a coded video and audio signal which is deposited in several data streams DS1, DS2, DS3, DS4, DS5. So-called intra-frames are provided within the data streams DS1, DS2, DS3, DS4, DS5. The video content of intra-frames is a complete video picture, as opposed to the inter-sequences which only transmit the changes of the new video picture in relation to the preceding one. When viewed over time the individual data streams, for example data stream 1 DS1, has a first intra-frame at 0 seconds, a second intra-frame at 30 seconds and a third intra-frame at 60 seconds. Data stream 2 DS2 has an intra-frame illustrated after 5 seconds, a second intra-frame after 35 seconds (sic). Data stream 3 DS3 has a first intra-frame illustrated after 10 seconds and a second intra-frame after 40 seconds. Data stream 4 DS4 has a first intra-frame illustrated after 15 seconds and a second intra-frame after 45 seconds. Therefore the data streams DS1 to DS4 differ in accordance with the placement of the intra-frames, thus the intra-coded video pictures. Data stream 5 DS5 has so-called "freeze frames". This means that intra-coded videos are shown following each other quickly in time-lapse form. However, intra-coded videos with intra-coded video sequences following each other in short sequences can also be provided. The positions of the intra-frames in the different data streams DS1 to DS4 and DS5 are stored in index data files. The intra-frames enable an application to the coded data stream in this position, because they contain a complete video picture. Multiple accesses by individual subscribers to one of the data streams DS1 to DS4 also takes place in the intra-frame position so that a complete video picture is available. If the application is made in the intra-sequence, the next intra-video must be awaited so that a complete video picture is again available. As already explained, the data stream 5 DS5 is composed of intra-coded videos and intra-coded sequences which follow each other in quick sequences. Branches extend from the individual data streams DS1 to DS4 to the data stream 5 DS5. To realize the rapid forward or rewind movement, data stream 1 DS1 branches up to data stream 4 DS4 and to data stream 5 DS5 and is wound in the respective direction. To continue the normal run, data stream 5 DS5 is abandoned and a suitable data stream is addressed. In this regard it means that the next intra-frame or its data stream is addressed.

This is explained in greater detail in the following by means of a configuration example and by FIG. 4. The individual data streams DS1 to DS5 are arranged as explained previously. A subscriber for example now wishes to fast-forward in the data stream VSP. To that end a branch is formed from the data stream in which it is presently located to the data stream 5 DS5. For example at time t=13 seconds a branch extends from data stream 2 DS2 to data stream 5 DS5, meaning to the next intra-frame. It now advances fast-forward and stops at time t=42 seconds for example. At this point the data stream is interrogated further. The next-in-line intra-frame is located at 45 seconds in the fourth data stream DS4.

Rewinding takes place in similar fashion and is indicated by RSP in the drawing.

To that end we exit from one of the data streams DS1 to DS4 at any point in time, jumping to the data stream DS5 and rewinding. After the rewinding we jump back to one of the data streams DS1 to DS4, meaning precisely to that data stream whose intra-frame follows next in the jump-back position. The forward and backward winding within a data stream is signalled by the video telephone set. This can take place for example by means of DTMF (Dual-Tone-Multi-Frequency) dialing. Another design could provide this in the ISDN data stream.

What is claimed is:

1. A digital ISDN video server for providing data streams of coded video and audio signals (CB1, CB2, . . . , CBm, CT1, CT2, . . . , CTn) for video telephones of different designs comprising:

a plurality of video coders (VC1, VC2, . . . , VCm) and a plurality of audio coders (AC1, AC2, . . . , ACn) for coding uncoded video signals (B) and uncoded audio signals (T), respectively, in real time to make available the coded video signals (CB1, CB2, . . . , CBm) and coded audio signals (CT1, CT2, . . . , Ctn) in different formats;

a switching unit (V) for performing signaling functions and for establishing a respective connection between the video telephones of different designs and the digital ISDN video server;

respective signaling means (TN1, . . . , TNp) for each video telephone for determining the coded video signals (CB1, CB2, . . . , CBm) and coded audio signals (CT1, CT2, . . . , CTn) which are processible by the respective video telephones, for multiplexing or demultiplexing the coded video signals (CB1, CB2 , . . . , CBm) and the coded audio signals (CT1, CT2, . . . , CTn) for a respective one of the video telephones, and for performing error correction for a respective one of the video telephones;

a switching network (AV-V) for respectively switching the coded video signals (CB1, CB2, . . . , CBm) and the coded audio signals (CT1, CT2, . . . , CTn) to the respective signaling means (TN1, . . . , TNp); and a controller (S) for controlling the provision of the data stream by the digital ISDN video server for the video telephones of different designs via the respective signaling means (TN1, . . . , TNp).

2. A digital ISDN video server as claimed in claim 1, comprising an audio/video memory (A/V-S) for providing stored, coded video signals (CB1', CB2', . . . , CBm') and coded audio signals (CT1', CT2', . . . , CTn') each having a different format.

3. A digital ISDN video server as claimed in claim 2, wherein the signals (CB1, CB2, . . . , CBm, CT1, CT2, . . . , CTn) made available in real time by the plurality of video coders (VC1, VC2, . . . , VCm) and the plurality of audio coders (AC1, AC2, . . . , ACn) are stored in the audio/video memory (A/V-S).

4. A digital ISDN video server as claimed in claim 3,
wherein the controller is designed as an interactive controller,
wherein the coded video signals (CB1', CB2', . . . , CBm') and coded audio signals (CT1, CT2, . . . , CTn) are stored in several data streams (DS1, DS2, DS3, DS4, DS5), and
wherein each of the data streams (DS1, DS2, DS3, DS4, DS5) contains differently positioned intraframes for restarting the coding to perform the functions of fast forward and rewind within the coded data stream.

5. A digital ISDN video server as claimed in claim 4, wherein multiple access by individual customers to a data stream is made possible via the intraframes.

6. A digital ISDN video server as claimed in claim 5, wherein data stream selection and control are effected by tone dialing or by signaling in the B channel.

7. A digital ISDN video server as claimed in claim 1, wherein said ISDN video server is used to implement a broadcast service.

8. A digital ISDN video server as claimed in claim 1, wherein said ISDN video server is used to implement an interactive service.

9. A digital ISDN video server as claimed in claim 2, wherein the controller is designed as an interactive controller, wherein the coded video and audio signals (CB1, CB2, . . . , CBm, CT1, CT2, . . . , CTn) are stored in several data streams (DS1, DS2, DS3, DS4, DS5), and wherein each of the data streams (DS1, DS2, DS3, DS4, DS5) contains differently positioned intraframes for restarting the coding to perform the functions of fast forward and rewind within the coded data stream.

10. A digital ISDN video server as claimed in claim 9, wherein multiple access by individual customers to a data stream is made possible via the intraframes.

11. A digital ISDN video server as claimed in claim 1, wherein data stream selection and control are effected by tone dialing or by signaling in the B channel.

* * * * *